(12) United States Patent
Bustos et al.

(10) Patent No.: US 8,181,702 B2
(45) Date of Patent: *May 22, 2012

(54) APPLICATION OF DEGRADABLE FIBERS IN INVERT EMULSION FLUIDS FOR FLUID LOSS CONTROL

(75) Inventors: Oscar Bustos, Trophy Club, TX (US); Syed Ali, Sugar Land, TX (US); Chau Nguyen, Houston, TX (US)

(73) Assignees: Schlumberger Technology Corporation, Sugar Land, TX (US); M-I L.L.C., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/817,977

(22) Filed: Jun. 17, 2010

(65) Prior Publication Data
US 2010/0319915 A1 Dec. 23, 2010

Related U.S. Application Data

(60) Provisional application No. 61/187,936, filed on Jun. 17, 2009.

(51) Int. Cl.
*E21B 33/138* (2006.01)
*E21B 43/28* (2006.01)
(52) U.S. Cl. ......... 166/279; 166/293; 166/300; 166/304
(58) Field of Classification Search .................. None
See application file for complete search history.

(56) References Cited

U.S. PATENT DOCUMENTS

| | | | |
|---|---|---|---|
| 6,218,342 B1 | 4/2001 | Patel | |
| 6,586,372 B1 | 7/2003 | Bradbury et al. | |
| 6,608,006 B2 | 8/2003 | Taylor et al. | |
| 6,790,811 B2 | 9/2004 | Patel | |
| 6,806,233 B2 | 10/2004 | Patel | |
| 6,989,354 B2 | 1/2006 | Thaemlitz et al. | |
| 7,066,260 B2 | 6/2006 | Sullivan et al. | |
| 7,152,697 B2 | 12/2006 | Horton et al. | |
| 7,178,550 B2 | 2/2007 | Stotkiewitz et al. | |
| 7,178,594 B2 | 2/2007 | Patel | |
| 7,222,672 B2 | 5/2007 | Blauch et al. | |
| 7,238,646 B2 | 7/2007 | Thaemlitz et al. | |
| 7,265,079 B2 | 9/2007 | Willberg et al. | |
| 7,267,291 B2 | 9/2007 | Bradbury et al. | |
| 7,350,573 B2 | 4/2008 | Reddy | |
| 7,377,721 B2 | 5/2008 | Patel | |
| 7,449,431 B2 | 11/2008 | Bradbury et al. | |
| 7,527,097 B2 | 5/2009 | Patel | |
| 2001/0051593 A1 | 12/2001 | Patel | |

(Continued)

FOREIGN PATENT DOCUMENTS
EP 1483353 B1 12/2004

*Primary Examiner* — Zakiya W Bates
(74) *Attorney, Agent, or Firm* — Michael Dae; Daryl Wright; Robin Nava

(57) ABSTRACT

A method of treating a subterranean formation including emplacing in a wellbore a fluid, comprising an oleaginous continuous phase, a non-oleaginous discontinuous phase, an emulsifier, at least one degradable material, and at least one bridging material, and contacting the formation with the fluid. A method and apparatus related to an invert emulsion fluid loss pill including an oleaginous continuous phase, a non-oleaginous discontinuous phase, an emulsifier, at least one degradable material, wherein the degradable material hydrolyzes to release an organic acid, and at least one bridging material.

22 Claims, 2 Drawing Sheets

U.S. PATENT DOCUMENTS

| | | |
|---|---|---|
| 2005/0059557 A1 | 3/2005 | Todd et al. |
| 2005/0065037 A1* | 3/2005 | Constien ............... 507/203 |
| 2005/0101492 A1 | 5/2005 | Bradbury et al. |
| 2006/0135372 A1* | 6/2006 | Hossaini et al. ............ 507/200 |
| 2006/0188651 A1 | 8/2006 | Bradbury et al. |
| 2007/0184987 A1 | 8/2007 | Brandbury et al. |
| 2008/0194433 A1 | 8/2008 | Tehrani |

* cited by examiner

APPLICATION OF DEGRADABLE FIBERS IN INVERT EMULSION FLUIDS FOR FLUID LOSS CONTROL

PRIORITY CLAIM

This application claims priority to U.S. Provisional Patent Application Ser. No. 61/187,936, filed Jun. 17, 2009, which is incorporated by reference herein in its entirety.

BACKGROUND OF INVENTION

1. Field of the Invention

Embodiments disclosed herein relate generally to fluid loss pills for use in oilfield operations.

2. Background Art

When drilling or completing wells in earth formations, various fluids typically are used in the well for a variety of reasons. The fluid often is water-based. For the purposes herein, such fluid will be referred to as "well fluid." Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, minimizing fluid loss into the formation after the well has been drilled and during completion operations such as, for example, perforating the well, replacing a tool, attaching a screen to the end of the production tubulars, gravel-packing the well, or fracturing the formation in the vicinity of the well, displacing the fluid within the well with another fluid, cleaning the well, testing the well, fluid used for emplacing a packer, abandoning the well or preparing the well for abandonment, and otherwise treating the well or the formation.

However, for a wellbore fluid to perform all of its functions and allow wellbore operations to continue, the fluid must stay in the borehole. Frequently, undesirable formation conditions are encountered in which substantial amounts or, in some cases, practically all of the wellbore fluid may be lost to the formation. For example, wellbore fluid can leave the borehole through large or small fissures or fractures in the formation or through a highly porous rock matrix surrounding the borehole.

When drilling progresses to the depth of penetrating a hydrocarbon bearing formation, special care may be required to maintain the stability of the wellbore. Examples of formations in which stability problems often arise include highly permeable and/or poorly consolidated formations. In these types of formations, a drilling technique known as "under-reaming" may be used. In under-reaming, the wellbore is drilled to penetrate the hydrocarbon bearing zone using conventional techniques. A casing generally is set in the wellbore to a point just above the hydrocarbon bearing zone. The hydrocarbon bearing zone then may be re-drilled, for example, using an expandable under-reamer that increases the diameter of the already-drilled wellbore below the casing.

The high permeability of the target formation, however, may allow large quantities of the drilling fluid to be lost into the formation. Once the drilling fluid is lost into the formation, it becomes difficult to remove. Calcium and zinc bromide brines, often used in completion fluids, can form highly stable, acid insoluble compounds when reacted with the formation or substances contained therein. This reaction may reduce the permeability and conductivity of the formation near the wellbore and thereby reduce the subsequent out-flow or production of targeted hydrocarbons. For example, fluid leakoff into the formation can occur during gravel placement and/or screen installation due to overbalance pressure, i.e., the difference in hydraulic head and reservoir pressure. After perforating, as another example, the completion fluid also tends to leak into the formation. The completion fluid can also be lost during the trip out and trip in to assemble the production tubing and the screen after the well is gravel packed. Generally, a flapper valve is used to isolate the screen and the formation from the wellbore fluids after the service tool and wash pipe are pulled out of the screen. If the flapper valve fails to isolate, the brine can be lost to the formation.

Providing effective fluid loss control without damaging formation permeability in completion operations has been a prime requirement for an ideal fluid loss-control pill. To control the fluid leak-off to the formation, a fluid loss control pill may be used to block the perforations or to form a filtercake on the formation face. In the case of fluid loss through the screen during trip out for assembling the screen and the production tubular, the fluid loss pill is spotted inside the screen to block the openings in the screen.

Conventional fluid loss control pills include oil-soluble resins, calcium carbonate, and graded salt fluid loss additives that have been used with varying degrees of fluid loss control. These pills achieve their fluid loss control from the presence of solvent-specific solids that rely on filter-cake build up on the face of the formation to inhibit flow into and through the formation. However, these additive materials can cause severe damage to near-wellbore areas after their application. This damage can significantly reduce production levels if the formation permeability is not restored to its original level.

After any completion operations have been accomplished, removal of filter cake formed from the fluid loss pill remaining on the sidewalls of the wellbore may be necessary. Although a fluid loss pill may be essential to completion operations, the barriers can be a significant impediment to the production of hydrocarbon or other fluids from the well if, for example, the rock formation is still plugged by the barrier. Because filter cake is compact, it often adheres strongly to the formation and may not be readily or completely flushed out of the formation by fluid action alone.

Accordingly, there exists a continuing need for fluid loss pills that may effectively reduce the ingress and egress of fluids between the formation and wellbore during a completion operation but that also minimizes formation damage.

SUMMARY OF INVENTION

In one aspect, embodiments disclosed herein relate to a method that includes emplacing in a wellbore a fluid comprising: an oleaginous continuous phase; a non-oleaginous discontinuous phase; an emulsifier; at least one degradable material; and at least one bridging material; and contacting the formation with the fluid.

In another aspect, embodiments disclosed herein relate to a method that includes forming a filtercake in a wellbore, the filtercake formed from an invert emulsion fluid loss pill, the invert emulsion fluid loss pill comprising: an oleaginous continuous phase; a non-oleaginous discontinuous phase; an emulsifier; at least one degradable material; and at least one bridging material; and allowing the degradable material to degrade.

In yet another aspect, embodiments disclosed herein relate to an invert emulsion fluid loss pill that includes an oleaginous continuous phase; a non-oleaginous discontinuous phase; an emulsifier; at least one degradable material, wherein the degradable material hydrolyzes to release an organic acid; and at least one bridging material.

Other aspects and advantages of the invention will be apparent from the following description and the appended claims.

DETAILED DESCRIPTION

Figure 1:
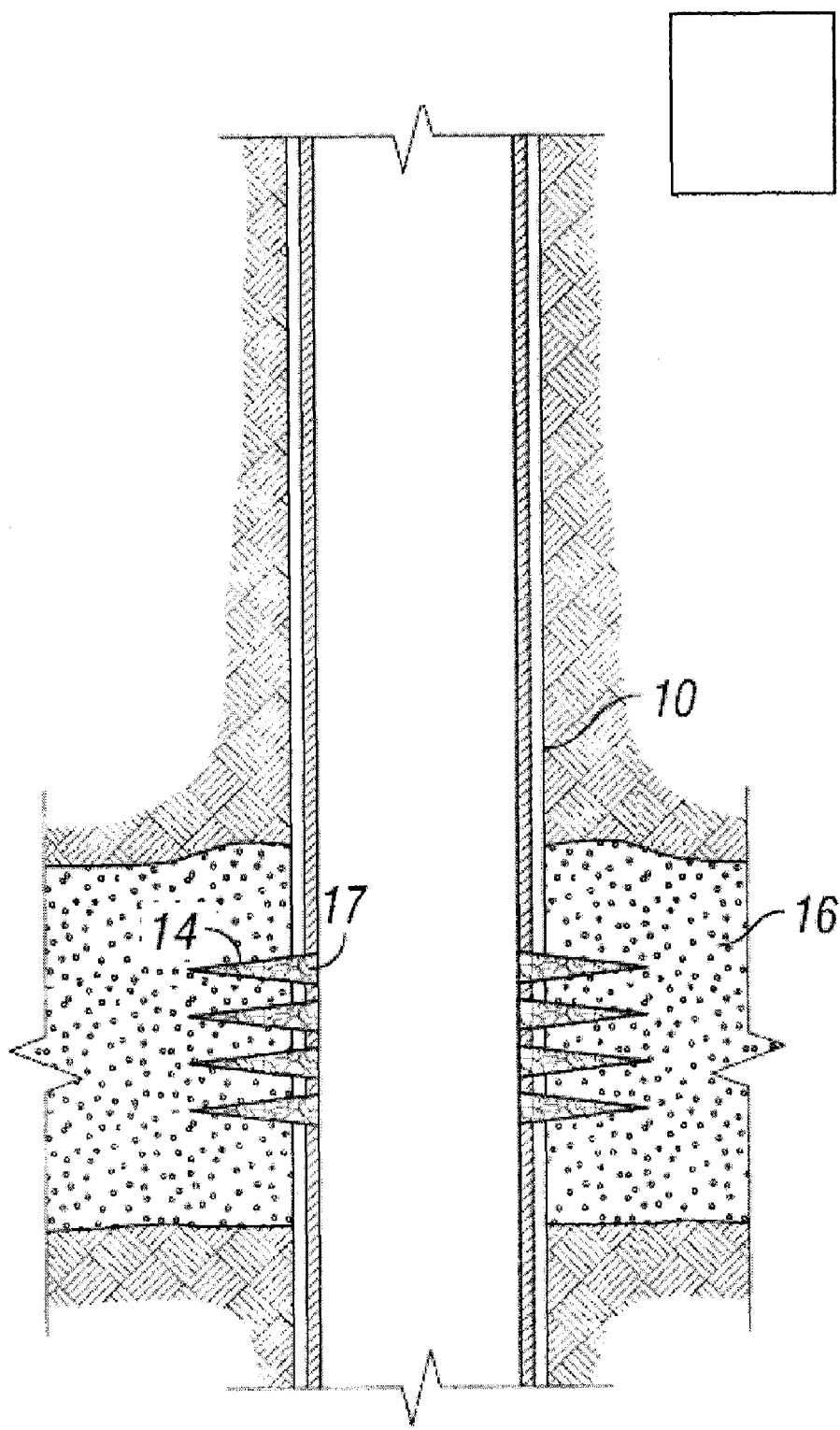
FIG. 1 is a schematic diagram of filtercake deposited in the perforation tunnels of a perforated casing after spotting a fluid loss pill according to an embodiment of the present disclosure.

In one aspect, embodiments disclosed herein relate to fluid loss pill treatments used in completion operations to reduce or prevent ingress and egress of fluids between a formation and a wellbore. In particular, embodiments disclosed herein relate to invert emulsion fluid loss pills having degradable fibers and a bridging material therein that may effectively bridge and seal off (through formation of a filtercake) perforations, pores, openings, etc. in a wellbore so that other completion operations may be performed. Because the fibers are degradable, the treatment may be temporary, allowing the filtercake to be easily broken and removed from the wellbore without or with minimal damage to the formation. Thus, the fluid loss pills of the present disclosure may include an oleaginous continuous phase, a non-oleaginous discontinuous phase, degradable fibers, a bridging agent, and at least one surfactant/emulsifier to stabilize the oleaginous and non-oleaginous phases as an invert emulsion. Each of the fluid components will be discussed in turn.

Degradable Materials

Degradable materials may include solid materials, such as fibers, that are soluble and hydrolyze in a base, such as solid cyclic dimers or solid polymers of certain organic acids that hydrolyze into soluble products readily in the presence of base. For example, such degradable fibers may be formed of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, or mixtures thereof.

Further examples of other degradable materials include those described in the publication of Advances in Polymer Science, vol. 157, "Degradable Aliphatic Polyesters," edited by A. C. Albertson (2001). Specific examples include homopolymers, random, block, graft, and star- and hyperbranched aliphatic polyesters. Polyesters can be prepared by, for example, polycondensation reactions, ring-opening polymerizations, free radical polymerizations, coordinative ring-opening polymerizations, and any other suitable process. Specific examples of suitable polymers include aliphatic polyesters; poly(lactides); poly(glycolides); poly($\epsilon$-caprolactones); poly(hydroxybutyrates); poly(anhydrides); aliphatic polycarbonates; poly(orthoesters); poly(amino acids); poly-phosphazenes, and the like.

The above mentioned degradable materials may be comprised solely of polyester particles, e.g., the pill may be free or essentially free of non-polyester solids, or the polyester may alternatively be mixed or blended with other degradable or dissolvable solids, for example, solids that react with the hydrolysis products, such as magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass. Moreover, examples of reactive solids that may be mixed include ground quartz (or silica flour), oil soluble resins, degradable rock salts, clays such as kaolinite, illite, chlorite, bentonite, or montmorillonite, zeolites such as chabazite, clinoptilolite, heulandite, or any synthetically available zeolite, or mixtures thereof. Degradable materials may also include waxes, oil soluble resins, and other materials that degrade or become soluble when contacted with hydrocarbons. Degradable materials are considered to degrade when at least one physical or chemical property of the material is altered from its original state. For example, the material may undergo hydrolysis or other physical or chemical change over time that alters one or more of its observable physical or chemical properties.

The degradable material may in the form of ribbons, platelets, fibers, flakes, or any other shape with an aspect ratio equal to or greater than one. The degradable materials may include particles having an aspect ratio greater than 10, greater than 100, greater than 200, greater than 250 or the like, such as platelets or fibers or the like. Further, the blended materials may take any form of composites, for example biodegradable material coatings or scaffolds with other materials dispersed therein. Further, the degradable particles may be nano-, micro-, or mesoporous structures that are fractal or non-fractal.

Exemplary fibers include, but are not limited to, polylactic acid polyester fibers, polyglycolic acid polyester fibers, polyvinyl alcohol fibers, and the like. Further exemplary fibers include polyester fibers coated to be highly hydrophilic, such as, but not limited to, DACRON™ polyethylene terephthalate (PET) fibers available from Invista Corp. Wichita, Kans., USA, 67220. When used in fluids of the present disclosure, the fiber component may be included at concentrations from about 5 to about 29 kg/m$^3$ of the liquid phase of the fluid, and more particularly, the concentration of fibers may be from about 11 to about 23 kg/m$^3$. However, one skilled in the art would appreciate that other amounts may be used.

Additional information related to relevant degradable materials may be obtained from U.S. Pat. Nos. 7,265,079, 7,350,573, and 7,066,260, which are incorporated by reference herein in their entirety.

Bridging Materials

Examples of bridging materials suitable for use in the present disclosure include calcium carbonate, dolomite ($MgCO_3.CaCO3$), barium sulfate (barite), ilmenite, hematite, olivine, siderite, galena, manganese oxide, iron oxides, strontium sulfate, celluloses, micas, proppant materials such as sands or ceramic particles and combinations thereof.

In order to achieve plugging or bridging of the perforation, fracture, or pores, a particulate treatment (particle type(s), particle geometry(s), concentration(s), and particle size distribution(s)) may be selected so that the bridging materials plug or bridge the mouth of the opening and finer particles may then form a tight filtercake behind the bridging particles, thus forming a seal and fluid loss control. Particle sizes may also be selected so that that bridging material enters into and is deposited in the opening by a process of dehydration as fluid phase of the fluid loss pill leaks-off into the formation. Further discussion of selection of particle sizes required to initiate a bridge may be found in SPE 58793, which is herein incorporated by reference in its entirety.

The concentration of the bridging material may vary depending, for example, the wellbore/formation in which the bridging materials are used, and in particular on the characteristics of the perforations, as well as the rate of fluid loss. However, the concentration should be at least great enough for the bridging material to bridge or plug the perforations or pores in the wall of the wellbore (or openings in a screen), but should not be so high as to make placement of the fluid impractical.

The sizing of the bridging material may also be selected based on the size of the perforations, pores, or openings in a given wellbore. In one embodiment, the bridging material has an average particle diameter in the range of 50 to 1500 microns, and from 250 to 1000 microns in another embodiment. In other embodiments, however, particles having an average particles diameter of less than 50 microns may be used. For example, in particular embodiments, micronized particles having a $d_{90}$ ranging from 1 to 25 microns and a $d_{50}$ ranging from 0.5 to 10 microns, such as the particles described in U.S. Pat. Nos. 6,586,372, 7,267,291, and 7,449,431, and U.S. Patent Publication Nos. 2007/0184987, 2006/0188651, and 2005/0101492, which are herein incorporated by reference in their entirety, may be used. The expression $d_{90}$ and $d_{50}$ represent diameters of particles when the percentage by volume or by weight of particles of that diameter as compared to the total volume or weight of the sample is 90 percent and 50 percent respectively. It is also within the scope of the present disclosure that any of the bridging materials may optionally be coated with a dispersant material, similar to that described in U.S. Pat. Nos. 6,586,372, 7,267,291, and 7,449,431, and U.S. Patent Publication Nos. 2007/0184987, 2006/0188651, and 2005/0101492.

The bridging material may comprise substantially spherical particles; however, it is also envisaged that the bridging material may comprise elongate particles, for example, rods, flakes, sheets, or fibers. Where the bridging material comprises elongate particles, the average length of the elongate particles should be such that the elongate particles are capable of bridging or plugging the induced fractures at or near the mouth thereof. Typically, elongate particles may have an average length in the range 25 to 2000 microns, preferably 50 to 1500 microns, more preferably 250 to 1000 microns. The bridging material may be sized so as to readily form a bridge or plug at or near the mouth of the perforations or pores. Further, in some embodiments, the bridging material may have a broad (polydisperse) particle size distribution; however, other distributions may alternatively be used.

Invert Emulsion

As discussed above, the fluid loss pills of the present disclosure may be invert emulsion, i.e., emulsions in which the non-oleaginous fluid is the discontinuous phase and the oleaginous fluid is the continuous phase.

The oleaginous fluid may be a liquid and more preferably is a natural or synthetic oil and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms, and the concentration of the oleaginous fluid may be less than about 99% by volume of the invert emulsion. In one embodiment the amount of oleaginous fluid is from about 30% to about 95% by volume of the invert emulsion fluid and more preferably about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein may be a liquid and preferably may be an aqueous liquid. More preferably, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus in one embodiment the amount of non-oleaginous fluid is less that about 70% by volume of the invert emulsion fluid and preferably from about 1% to about 70% by volume of the invert emulsion fluid. In another embodiment, the non-oleaginous fluid is preferably from about 5% to about 60% by volume of the invert emulsion fluid.

Also typically included are emulsifiers and emulsifier systems for stabilizing the emulsion. As used herein, emulsifier, emulsifying agent, and surfactant are used interchangeably. The emulsifying agent serves to lower the interfacial tension of the liquids so that the non-oleaginous liquid may form a stable dispersion of fine droplets in the oleaginous liquid. A full description of such invert emulsions may be found in Composition and Properties of Drilling and Completion Fluids, 5th Edition, H. C. H. Darley, George R. Gray, Gulf Publishing Company, 1988, pp. 328-332, the contents of which are hereby incorporated by reference.

Emulsifiers that may be used in the fluids disclosed herein include, for example, fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above. Additionally, the fluid may also contain surfactants that may be characterized as wetting agents. Wetting agents that may be suitable for use in the fluids disclosed herein include crude tall oil, oxidized crude tall oil, organic phosphate esters, modified imidazolines and amidoamines, alkyl aromatic sulfates and sulfonates, and the like, and combinations or derivatives of these. However, when used with the invert emulsion fluid, the use of fatty acid wetting agents should be minimized so as to not adversely affect the reversibility of the invert emulsion disclosed herein. FAZE-WET®, VERSACOAT®, SUREWET®, VERSAWET®, and VERSAWET® NS are examples of commercially available wetting agents manufactured and distributed by M-I L.L.C. of Houston, Tex. that may be used in the fluids disclosed herein.

In a particular embodiment, the invert emulsion may be of the reversible type, whereby the invert emulsion may be converted from a water-in-oil type emulsion to an oil-in-water type emulsion upon exposure to acid, for example. Such reversible oil-based fluids include those described in U.S. Pat. Nos. 6,218,342, 6,806,233 6,790,811, 7,527,097, 7,238,646, 6,989,354, 7,178,550, 6,608,006, 7,152,697, 7,178,594, 7,222,672, 7,238,646 and 7,377,721, for example, which are herein incorporated by reference in their entirety.

Additionally, lime or other alkaline materials may be added to the invert emulsion fluid loss pill of the present disclosure to maintain a reserve alkalinity. The generally accepted role of the reserve alkalinity is to help maintain the viscosity and stability of the invert emulsion. Absent an alkaline reserve, acidic gases may weaken the stability of the invert emulsion fluids to the point of failure. That is to say the invert emulsion becomes so unstable that the continuous oleaginous phase and the discontinuous non-oleaginous phase irreversibly "flip." Additionally, the reserve alkalinity may also serve to aid in solubilization and/or degradation of the degradable materials described above, so that they may hydrolyze and aid in breaking or degradation of the invert emulsion filter cake. In a particular embodiment, lime (or other suitable alkaline materials) may be added such that the non-oleaginous phase may have an equivalent pH of at least 8.3, or greater than 10 or 11 in other embodiments.

Conventional methods may be used to prepare the fluid loss pills disclosed herein in a manner analogous to those normally used to prepare conventional oil-based fluids. In one embodiment, a desired quantity of oleaginous fluid such as a base oil and a suitable amount of a surfactant are mixed together and the remaining components are added sequentially with continuous mixing. An invert emulsion may also be formed by vigorously agitating, mixing or shearing the oleaginous fluid and the non-oleaginous fluid.

However, in a particular embodiment, the fluid loss pill may be formulated by mixing together a desired quantity of oleaginous fluid such as a base oil and a suitable amount of a surfactant. The degradable fibers may be added to the non-oleaginous fluid prior to mixing with the oleaginous fluid. Once the oleaginous fluid (with surfactant) and non-oleaginous fluid (with fibers) are added together, lime or other similar alkaline materials may be added to the mixture, followed by the bridging materials. The invert emulsion may be formed by vigorously agitating, mixing or shearing the mixture As mentioned above, the invert emulsion fluid loss pills of the present disclosure may be spotted or otherwise emplaced in a perforated wellbore in the production zone, i.e., adjacent the perforations, in a zone experiencing fluid loss (through pores in the formation), or in any other zone of the wellbore where prevent or minimization of fluid ingress and egress is desired. For example, the fluid loss pill has degradable fibers and bridging materials therein that may effectively bridge and seal off (through formation of a filtercake) the perforations or other openings so that other completion operations may be performed.

Such completion operations may include, for example, cleanout, gravel packing, or other completion operations, including tripping a tool string in or out of the well. By placing the fluid loss pill in the formation adjacent perforations, formation pores, etc, a filter may be formed and plug a perforation tunnel or pore throat, e.g., in a cased or open-hole completion, until cleanout. For example, fluid loss control pills may be used to control leak-off of completion brine after perforating and before gravel packing or frac-packing. Because the degradable fibers may degrade spontaneously after a certain period of time at the downhole conditions, the methods and fluids of the present disclosure may allow for the effective removal of the filtercake from the well to facilitate proper gravel placement in the perforation tunnels, for example.

In other embodiments, the fluids of the present disclosure may be emplaced in a well to seal the formation face in the completion zone prior to gravel placement. The fluid described herein may be positioned in the wellbore to contact the formation face at the perforations and may then be overbalanced to force the liquid phase into the formation and form a filtercake by bridging the perforations with the bridging material. The degradable fibers may then form a fiber-based mat over the formation wall. Solid particles may also be deposited on the fiber-based mat that is created across a permeable zone.

In another embodiment, the fluids of the present disclosure may be emplaced in a well on a screen after gravel packing. For example, a pill may be used to isolate the completion and wellbore fluid after gravel packing by spotting the pill inside the screen. Further, in a particular embodiment, the fluid loss pill may comprise particles having a mean diameter greater than one-sixth the width of openings in the screen. In an embodiment where the completion operation comprises using a valve to isolate the formation from the wellbore fluid, the filter cake on the screen may inhibit fluid loss in the event of valve failure. In an alternate or additional embodiment, the completion operation may include pulling a wash pipe or service tool from adjacent the screen, assembling production tubing to the screen, a combination thereof or the like. In yet another embodiment, regardless of whether the filter cake is internal or external, the completion operation can include tripping a tool string in or out of the well.

In an embodiment, the polyester bridging agent can decompose spontaneously at the downhole temperature and aqueous environment into soluble hydrolysis products, facilitating filtercake removal even without a distinct flushing step. In an embodiment, the method can include backflow flushing of filtercake residue wherein flushing fluid consists essentially of reservoir fluid produced in situ from the formation after the filtercake is formed. In another embodiment, reservoir fluid can be produced directly from the formation without intermediate recirculation of a flushing fluid in the well to remove filtercake residue.

Upon degradation/hydrolysis of the degradable fibers, a weak organic acid is released, which may also aid in the dissolution of the bridging materials (depending on the type of bridging material selected). Even if there is minimal dissolution of the bridging materials, the filtercake may be broken (or degraded) due to the degradation of the fibers and fiber mat. As used herein, breaking or degradation of a filtercake encompasses reducing the amount of filter cake or increasing its permeability by dissolving at least a portion of the filter cake. Depending on the fluid type used, the released acid may also reverse the emulsion (from invert to direct) when a reversible fluid is used, as described above. In such an instance, the residual fluid/filtercake may be collected (at the surface) as a direct (oil-in-water) emulsion rather than an invert (water-in-oil) emulsion. When the fluid is not reversible, the remaining fluid/filtercake may be collected (at the surface) as two phases.

Depending on the downhole environment (frequently 79-149° C.), the degradation fibers may decompose into soluble hydrolysis products, facilitating filtercake removal even without a distinct flushing step. A particular embodiment may include backflow flushing of filtercake residue with a flushing fluid of reservoir fluid produced in situ from the formation after the filtercake is formed. In another embodiment, reservoir fluid may be produced directly from the formation without intermediate recirculation of a flushing fluid in the well to remove filtercake residue.

As mentioned above, the fluids loss pills of the present disclosure are also suitable for use in open hole completions. Open hole completions refers to wellbores having underreamed zones wherein the producing formation is underreamed to enhance productivity. The fluid loss pills described herein may be positioned in the wellbore to contact the formation face and overbalanced to force the liquid carrier into the formation and form a filtercake by screening the bridging agent particles at the entrances to the pores or other passages opening at the formation surface.

FIG. 1 shows an embodiment of a casing 10 with perforation tunnels 14 in the producing interval 16, wherein a filtercake 17 has been deposited in the perforation tunnels 14 to inhibit fluid entry into the formation during cleanout of perforation debris and/or until other completion operations have occurred. After the formation is sealed, gravel may be placed in the completion zone using a screen assembly and wash pipe or other appropriate service tool according to any of various gravel placement techniques, such as, for example, reverse circulation of a gravel slurry, crossover, or the like.

EXAMPLES

Several invert emulsion fluid loss pills were manufactured and observed:

Fluid 1 contains water (73% v/v), mineral oil (27% v/v), VERSACOAT™ (6-10 ppb (17.1-28.5 kg/m$^3$)), which is a surfactant commercially available from M-I L.L.C. of Houston, Tex., lime (11.4-17.1 kg/m$^3$), 1.13 SG (1,130 kg/m$^3$) CaCl$_2$ (64% v/v), calcium carbonate 2 microns in size (28.5-85.6 kg/m3), calcium carbonate 10 microns in size (28.5-85.6 kg/m$^3$), and degradable fibers (12-18 kg/m$^3$) commercially available from Schlumberger Technology Corporation of Sugar Land, Tex. Fluid 1 contains fibers in a concentration of 18 kg/m$^3$ and Fluid 2 contains the same components as Fluid 1, except that fibers are present in a concentration of 12 kg/m$^3$.

Fluid 3 is a reversible emulsion system that includes water (52% v/v), mineral oil (48% v/v), VG-PLUS (2.9-8.6 kg/m$^3$), an organophilic clay commercially available from M-I L.L.C. of Houston, Tex. as VG-Plus, FAZEMUL® (22.8-34.2 kg/m$^3$), which is a surfactant commercially available from M-I L.L.C. of Houston, Tex., lime (11.4-17.1 kg/m$^3$), 1.28 SG (1,280 kg/m$^3$) CaCl$_2$ (41% v/v), calcium carbonate 2 microns in size (28.5-85.6 kg/m$^3$), calcium carbonate 10 microns in size (28.5-85.6 kg/m$^3$), and degradable fibers (12-18 kg/m$^3$) commercially available from Schlumberger Technology Corporation of Sugar Land, Tex.

Figure 2:
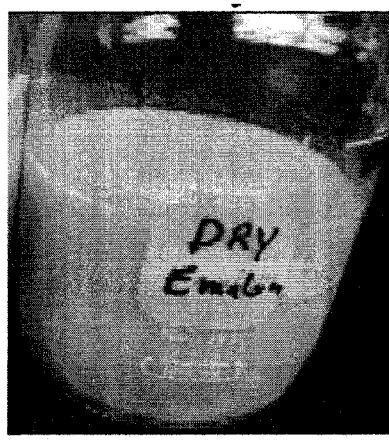
FIG. 2 shows a photograph of an invert emulsion fluid mixed with degradable fibers in accordance with one embodiment.
Figure 3:
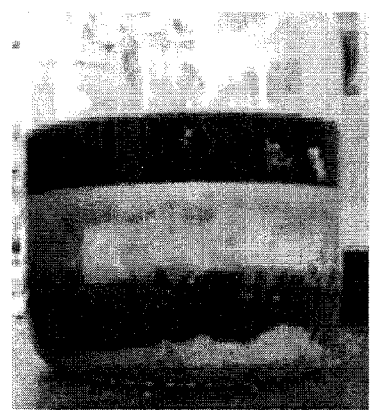
FIG. 3 shows a photograph of the mixture shown in FIG. 2 after 100 hours at 93° C.

Fluid 1 was subjected to a fiber dissolution bottle test to determine the timing for complete fiber dissolution (hydrolysis time). The results showed that at 93° C., fibers are dissolved in about 100 hour when exposed to Fluid 1. After 100 hours at 93° C., as illustrated in FIG. 2 (before) and FIG. 3 (after), the fibers dissolve in the system and layers of oil, residual calcium carbonate, and calcium lactate may form.

Fluid rheology was determined on a Fann 35 Viscometer available from Fann Instrument Company, and fluid loss properties were measured using a high pressure, high temperature fluid loss test performed at 3447 kPa and 79° C. Table 1 compares the rheology properties of the three fluids including plastic viscosity (PV), yield point (YP), and electrical stability (ES).

TABLE 1

| Rheology (RPM) | 1 | 2 | 3 (Fazepro) |
| --- | --- | --- | --- |
| 600 | 101 | 123 | 68 |
| 300 | 65 | 80 | 43 |
| 200 | 51 | 62 | 33 |
| 100 | 34 | 39 | 22 |
| 6 | 8 | 7 | 9 |

TABLE 1-continued

| Rheology (RPM) | 1 | 2 | 3 (Fazepro) |
| --- | --- | --- | --- |
| 3 | 7 | 6 | 8 |
| Plastic Viscosity (Pa · s) | 0.036 | 0.043 | 0.025 |
| Yield Point (Pa) | 13.86 | 17.68 | 8.6 |
| Electrical Stability (volts) | 58 | 36 | 433 |

TABLE 2

| | Fluid 1 | | Fluid 3 | |
| --- | --- | --- | --- | --- |
| Fluid Loss (mls) | with fibers | Without Fibers | with fibers | Without Fibers |
| spurt | 0.5 | 1.5 | 4 | 2.5 |
| 1 min | 2 | 2.5 | 7 | 5.4 |
| 4 min | 2.6 | 2.8 | 9 | 6.8 |
| 9 min | 2.8 | 3 | 10.8 | 8.6 |
| 16 min | 2.9 | 3.6 | 12 | 9.7 |
| 25 min | 3 | 3.9 | 13.2 | 10.2 |
| 30 min | 3.6 | 4.2 | 13.5 | 10.6 |
| 36 min | 3.8 | 4.4 | 14.4 | 10.8 |
| 1 hr | 4.4 | 5 | 15.5 | 13.2 |

Figure 4:
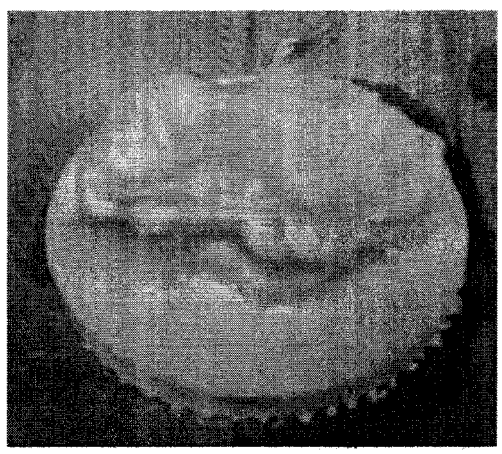
FIG. 4 shows a photograph of an invert emulsion fluid mixed with degradable fibers on an Aloxite disk in accordance with one embodiment.
Figure 5:
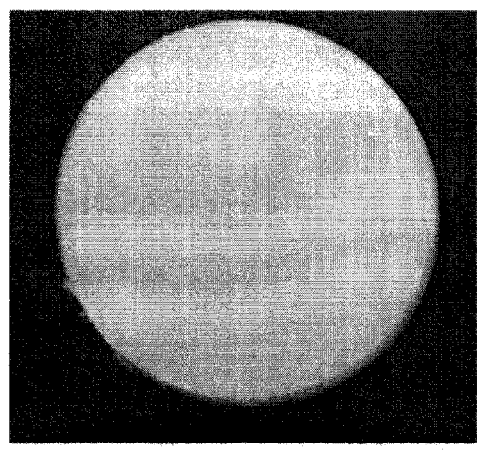
FIG. 5 shows a photograph of the mixture shown in FIG. 4 after 168 hours at 79° C.

The high pressure high temperature tests were conducted in a fluid loss cell using 3 micron Aloxite disks. As shown in FIG. 4 (before) and FIG. 5 (after), after 168 hrs at 79° C., the fibers are decomposed and reacted with most of the carbonates in the sample, leaving the disk without any residual fibers or carbonate bridging particles.

Embodiments of the present disclosure may provide at least one of the following advantages. An invert emulsion fluid having degradable fiber-based materials and bridging materials may serve as a fluid loss pill in cased or open-hole well to temporarily minimize the ingress and egress of fluids through the perforations while completions operations may be performed. Upon completion of the completion operations, the fluid loss pill may self-destruct through the degradation of the degradable fiber based materials in water and high temperatures, reducing any solids from being left behind. The hydrolysis of the fibers may also contribute (to some extent) to the dissolution of the bridging materials, as well as the reversal of the emulsion when a reversible emulsion is used.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:
1. A method of treating a subterranean formation, comprising:
    emplacing in a wellbore a fluid, comprising:
        an oleaginous continuous phase;
        a non-oleaginous discontinuous phase;
        an emulsifier;
        at least one degradable material; and
        at least one bridging material; and
    contacting the formation with the fluid; and
    allowing the degradable material to hydrolyze over a period of time to release an organic acid, which reverses the fluid such that the oleaginous fluid is the discontinuous phase and the non-oleaginous fluid is the continuous phase.

2. The method of claim 1, wherein the fluid is a fluid loss pill.

3. The method of claim 1, further comprising
initiating production of formation fluids through the wellbore.

4. The method of claim 1, further comprising performing at least one completion operation in the wellbore.

5. The method of claim 4, wherein the completion operation comprises cleanout.

6. The method of claim 4, wherein the completion operation comprises gravel packing.

7. The method of claim 6, wherein the filtercake is formed after gravel packing.

8. The method of claim 1, further comprising forming a filtercake.

9. The method of claim 8, wherein the filtercake plugs a perforation tunnel.

10. The method of claim 8, wherein the filtercake is formed on a screen.

11. The method of claim 1, wherein the degradable material comprises at least one of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, or mixtures thereof.

12. The method of claim 1, wherein the fluid further comprises lime.

13. The method of claim 1, wherein the bridging materials comprise at least one of calcium carbonate, dolomite, barium sulfate, ilmenite, hematite, olivine, siderite, galena, manganese oxide, iron oxides, strontium sulfate, celluloses, micas, proppant materials, or mixtures thereof.

14. The method of claim 1, wherein the oleaginous phase is selected from diesel oil, mineral oil, synthetic oil, ester oils, glycerides of fatty acids, aliphatic esters, aliphatic ethers, aliphatic acetals, or combinations thereof.

15. The method of claim 1, wherein the non-oleaginous phase is selected from fresh water, sea water, brine, aqueous solutions containing water soluble organic salts, water soluble alcohols or water soluble glycols or combinations thereof.

16. The method of claim 1, wherein the emulsifier comprises at least one of fatty acids, soaps of fatty acids, amidoamines, polyamides, polyamines, oleate esters, imidazoline derivatives or alcohol derivatives or combinations or derivatives thereof.

17. A method, comprising:
forming a filtercake in a wellbore, the filtercake formed from an invert emulsion fluid loss pill, the invert emulsion fluid loss pill comprising:
an oleaginous continuous phase;
a non-oleaginous discontinuous phase;
an emulsifier;
at least one degradable material; and
at least one bridging material; and
allowing the degradable material to degrade over a period of time to release an organic acid, which reverses the fluid such that the oleaginous fluid is the discontinuous phase and the non-oleaginous fluid is the continuous phase.

18. The method of claim 17, wherein the allowing the material to degrade breaks the filtercake.

19. The method of claim 17, wherein the degradable material comprises at least one of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, or mixtures thereof.

20. The method of claim 17, wherein the fluid loss pill fluid further comprises lime.

21. The method of claim 17, wherein the bridging materials comprise at least one of calcium carbonate, dolomite, barium sulfate, ilmenite, hematite, olivine, siderite, galena, manganese oxide, iron oxides, strontium sulfate, celluloses, micas, proppant materials, or mixtures thereof.

22. The method of claim 17, wherein the emulsifier comprises at least one of fatty acids, soaps of fatty acids, amidoamines, polyamides, polyamines, oleate esters, imidazoline derivatives or alcohol derivatives or combinations or derivatives thereof.

\* \* \* \* \*